(12) United States Patent
Inoue et al.

(10) Patent No.: US 6,317,732 B1
(45) Date of Patent: Nov. 13, 2001

(54) PLANNING SYSTEM AND PLANNING METHOD

(75) Inventors: Haruki Inoue, Hitachinaka; Mayumi Mizutani, Kuwana; Masami Shiozawa, Hitachi; Satoru Yoshikawa, Ibaraki-ken, all of (JP)

(73) Assignee: Hitachi Engineering Co., Ltd., Ibaraki-ken (JP)

( * ) Notice: Subject to any disclaimer, the term of this patent is extended or adjusted under 35 U.S.C. 154(b) by 0 days.

(21) Appl. No.: 08/925,186

(22) Filed: Sep. 8, 1997

(30) Foreign Application Priority Data

Sep. 9, 1996 (JP) .................................................. 8-237644

(51) Int. Cl.$^7$ ...................................................... G06N 3/12
(52) U.S. Cl. .................................. 706/46; 705/8; 706/13; 707/3
(58) Field of Search ......................... 706/46, 13; 707/3; 705/8

(56) References Cited

U.S. PATENT DOCUMENTS

| | | | |
|---|---|---|---|
| 5,101,352 | * | 3/1992 | Rembert ..................................... 705/8 |
| 5,265,006 | * | 11/1993 | Asthana et al. ............................ 705/8 |
| 5,291,394 | * | 3/1994 | Chapman .................................... 705/8 |
| 5,623,580 | * | 4/1997 | Inoue et al. ............................... 706/46 |
| 5,651,098 | * | 7/1997 | Inoue et al. ............................... 706/13 |
| 5,819,263 | * | 10/1998 | Bromley et al. ........................... 707/3 |

OTHER PUBLICATIONS

"Algorithm for Pattern Recognition and Learning", Bunnichi Sohgoh Shuppan, by Y. Kamisaka and K. Ozaki, pp. 109–119 and 186–13 No translation is available.*

"The Capacitated Canadian Postman Problem" by Serge Roy, Jean–Marc Rousseau INFOR vol. 27, No. 1, 1989.*

* cited by examiner

*Primary Examiner*—Tariq R. Hafiz
*Assistant Examiner*—Wilbert L. Starks
(74) *Attorney, Agent, or Firm*—Antonelli, Terry, Stout & Kraus, LLP

(57) ABSTRACT

A planning system includes an input device which accepts at least a given planning problem and values of variables required to solve the given planning problem; a display device which provides a visual display of an optimum plan obtained for the given planning problem; and a planner device which prepares an objective function representing items to be averaged and designs a plan to minimize a value of the objective function. The planner device includes an initial plan reader which reads an initial plan; an objective function value operation unit which calculates an objective function value of the initial plan; a reproduction unit which generates random numbers to a set composed by elements contacting to boundary planes of divided subsets, wherein the random numbers include a range of number of contacting elements and an equally-opportunity-selectable distribution, select at least one element based on the random numbers, equal-opportunity-selecting one of the subsets to which element contacts, and schedule the plan such that the selected element is rendered to belong to the selected subset; a plan renewal unit which compares the objective function value of the current plan with the objective function value of the previous plan to determine the plan having a smaller objective function value as an optimum plan; and a control unit which provides a visual display of an optimum plan on the display device.

11 Claims, 19 Drawing Sheets

FIG. 9

| C | | |
|---|---|---|
| | 1 | 97 |
| | 2 | 65 |
| | 3 | 89 |
| | 4 | 94 |
| | 5 | 92 |
| | 6 | 31 |
| | 7 | 68 |
| | 8 | 15 |
| | 9 | 77 |
| | 10 | 79 |
| | | 23 |
| | | 5 |
| | | 19 |
| | | 13 |

OBJECTIVE FUNCTION VALUE
DIFFERENCE EVALUATION TABLE

TRANSITION OF $C(i)$
DISTRIBUTION AREA
WHEN $C_1 = 100$

PLANNING SYSTEM AND PLANNING METHOD

CROSS-REFERENCE TO RELATED APPLICATIONS

This application relates to U.S. Ser. No. 274,016 filed Jul. 12, 1994, now U.S. Pat. No. 5,623,580 issued Apr. 22, 1997, assigned to Hitachi, Ltd. and Hitachi Engineering Co., Ltd., the disclosure of which is incorporated herein by reference.

BACKGROUND OF THE INVENTION

The present invention relates to a planning system and a planning method, and more particularly to technology for offering meshing information when an assigned section is to be taken charge of by a plurality of persons in distributing and collecting items and discussing various problems, technology for offering meshing information for conducting strength test of an article, technology for offering work division information when a work is to be conducted by a plurality of persons or technology for offering meshing information technology for conducting city planning, and further particularly to linear programming system and method suitable for determining a solution with a simple construction as to a problem for unifying the meshing.

The meshing planning and designing relates to a problem to divide a given assigned section (one to three-dimension) by a given divisor and determine such a solution that makes weights of the divided sections, for example, areas, weights or work amounts uniform for each divided section.

This problem is considered as a kind of clustering problem. Namely, it is equivalent to "determine a direct sum partition $\{S_1, \ldots, S_n\}$ (where $S_i$ is a set of divisions) of a definite set of patterns W which minimizes summation of distortion $(S_1, \ldots, S_n)$ (where $S_i$ is a set of divisions) for such W".

There are only a definite number of methods for direct sum partitioning the definite set W having M elements into N partial sets and hence it has been known that this problem can necessarily be solved by an enumeration method in principle but the number of cases (the number of combinations) of such direct sum partition is:

$$\frac{1}{N!}\sum_{k=1}^{N}(-1)_N^{N-k} C_k K^M \qquad (1)$$

Accordingly, in an actual problem, for example, in case of M>1,000 and N>100, it is a huge number and it is very difficult to get a solution within a practical time even if a today's fastest computer is used.

For this problem, an LBG algorithm as disclosed in the article "Algorithm for Pattern Recognition and Learning", Bunnichi Sohgoh Shuppan, by Y. Kamisaka and K. Ozaki, p. 112~119 or various OR (operations research method) techniques have been proposed.

However, the planning method disclosed in the above reference includes at least two problems.

First, in order to determine an optimum meshing plan, a repetitive process of at least third power of the number N of elements of a problem in question is needed and it is very difficult to determine a solution at a high speed.

Secondly, there is a problem of very low probability of reaching an optimum solution.

SUMMARY OF THE INVENTION

It is an object of the present invention to provide a planning system and planning method for determining a solution which makes uniform the weights of divided sections of an assigned section divided by a given divisor, for example, areas, weights or work amounts uniform with a simple construction for a problem in the assigned section in distributing and collecting articles and visiting for various discussions.

It is another object of the present invention to provide a planning system and planning method for determining a solution which makes uniform the weights of a set of divisions of an assigned section divided by a given divisor for a problem of the assigned section with a simple construction and reaching an optimum solution.

In order to solve the above problems and achieve the objects of the present invention, the planning system of the present invention includes the following aspects.

A planning system for dividing an object continuously composed by a plurality of elements having weights by a given divisor and determining a solution, by the planning, for a problem to average total values of the weights of respective divided subsets, comprising a planning device for preparing an objective function representing items to be averaged and designing a plan to minimize the value of the objective function and a memory device for storing at least variables necessary for designing the plan.

The planning device comprises:

an objective function value operation unit for calculating an objective function value of an initial plan;

reproduction unit for generating random numbers having a range of the number of elements of a set composed by elements contacting to boundary planes of the divided subsets, said random numbers having an equally-opportunity-selectable distribution or a normal distribution, selecting at least one element based on the random numbers, equally-opportunity-selecting one of the subsets to which the element contacts and scheduling the plan such that the selected element is rendered to belong to the selected subset; and a plan renewal unit for comparing the objective function value for the previous plan and the objective function value for the new plan and sequentially determining the plan having a smaller objective function value as an optimum plan candidate.

In accordance with another aspect of the present invention, there is provided a planning system for dividing an object continuously composed by a plurality of elements having weights by a given divisor and determining a solution, by the planning, for a problem to average total values of the weights of respective divided subsets, comprising a setting device for accepting at least the object of the problem and variables necessary for solving the problem, a planning device for preparing an objective function representing items to be averaged in said problem and designing a plan to minimize the value of the prepared objective function, a memory device for storing at least variables necessary for designing the plan and a display device for displaying a result of the planning.

The said planning device comprises:

an initial plan read unit for reading a previously prepared initial plan;

an objective function value operation unit for calculating an objective function value of an initial plan;

reproduction unit for generating random numbers having a range of the number of elements of a set composed by elements contacting to boundary planes of the divided subsets, with the random numbers having an equallyopportunity-selectable distribution or a normal distribution, selecting at least one element based on the random numbers, equal-opportunity-selecting one of the subsets to which the element contacts and scheduling the plan such that the selected element is rendered to belong to the selected subset;

a plan renewal unit for comparing the objective function value for the previous plan and the objective function value for the new plan and sequentially determining the plan having a smaller objective function value as an optimum plan candidate; and a control unit for starting the objective function value operation unit, the plan renewal unit and said reproduction unit a predetermined number of times and displaying a final optimum plan on the display unit.

The objective function value operation unit is constructed as an unit to calculate the following formula representing a standard deviation of weights of the elements of the divided subsets as the objective function value:

$$\sqrt{\sum_{i=1}^{n}(\overline{X}-x_i)^2/n} \tag{2}$$

where n is a divisor, $x_i$ is a summation of weights of the elements of i-th divided set, and $\overline{X}$ is a mean value from $x_1$ to $x_n$.

The objective function value operation unit is preferably a unit for calculating a difference between a difference between summations of weights of at most two unaltered subsets and a difference between those of at most two altered subsets as the objective function value.

The plan renewal unit is preferably constructed to compare, when sequentially determining the optimum plan candidate, compares a difference between the objective function plans in the previous plan and the new plan and a variable C(i) predetermined for each number of times of planning i, and when the difference between the objective function values is smaller than the preset variable C(i), replaces the previous plan by the current plan to determine it as the optimum plan candidate.

In accordance with other aspect of the present invention, the following method is provided.

A computer-implemented method for obtaining by planning a solution for a problem to average summations of weights of elements of subsets derived by dividing an object continuously composed by a plurality of elements having weights by a given divisor, comprises:

an objective function value operation step for calculating an objective function value of an initial plan;

a reproduction step for generating random numbers having a range of the number of elements of a set composed by elements contacting to boundary planes of the divided subsets, with the random numbers having an equally-opportunity-selectable distribution or a normal distribution, selecting at least one element based on the random numbers, equally-opportunity-selecting one of the subsets to which the element contacts and scheduling the plan such that the selected element is rendered to belong to the selected subset; and a plan renewal step for comparing the objective function value for the previous plan and the objective function value for the new plan and sequentially determining the plan having a smaller objective function value as an optimum plan candidate;

said steps being started a predetermined number of times to output a final optimum plan.

In the present invention, the number of combinations for dividing by a given divisor N the definite set W having M elements which is on object of the meshing plan is:

$$\frac{1}{N!}\sum_{k=1}^{N}(-1)_N^{N-k}C_k K^M \tag{3}$$

There is necessarily at least one meshing plan which minimizes the objective function $F(S_1, \ldots, S_n)$ where F represents the objective function and $S_1$ represents the set of divisions. However, the number of cases or combinations (formula 2) in case of M>1,000 and N>100 is huge and it is not possible to calculate those in a practical time.

In accordance with the present invention, the partition plan which makes the objective function F minimum or very close to minimum in a very short time can be attained in the following manner.

Namely, of elements $m_j$ (j=1~M) which constitute a division $L_{i-1}$ ($S_1, \ldots, S_n$), for elements $M_s$ (s=1~T, T≦M) of sets of elements $B_i$ which contact to boundary lines (or planes) at which respective $S_k$ (k=1~N) contact to each other, one element $m_t$ is selected by using a random number which is uniform in 1~T.

Then, for at least two sets of divisions $S_a, S_b, \ldots, S_i$ to which $m_t$ contacts, $S_g$ is selected at a uniform probability and that $m_t$ is set as an element of $S_g$. At this time, $m_t$ is deleted from the set which it belonged to. This is referred to as a reproduction. This division is defined as $L_i$.

A difference between the objective function value $F_{i-1}$ of the previous division $L_{i-1}$ and the objective function value $F_i$ of the current division $L_i$ caused by the reproduction can be determined by only an operation on the modified part without depending on N and M. When the objective function value determined in this manner is not smaller than a predetermined value (for example, $F_i-F_{i-1}>0$), the previous plan is replaced by the current plan to determine it as an optimum planning.

It is also sufficient to simply compare the objective function value of the previous plan and the objective function of the new plan, and when the objective function value for the new plan is smaller than the objective function of the previous plan, the previous plan is replaced by the current plan to sequentially determine an optimum candidate.

By repeating the above steps by at least $C \times N^2$ times (where C is a constant), L which minimizes the objective function value, that is, an optimum partition plan can be determined.

In the prior art method, the repetitive process of at least $N^M$ is needed as shown by the formula (3). In accordance with the present invention, the repetitive process of the order of $M \times N^2$ at most is needed. For example, assuming that M=10,000 (the number of elements of W) and N=100 (divisor), in the prior art method, it is $$N^M = 100^{10000} \tag{4}$$

$$= 10^{20000} \quad (20000 \text{ of } 0's)$$

On the other hand, in the present invention, it is $$M \times N^2 = 10000 \times (100)^2 \tag{5}$$

-continued $$= 10^8$$

Namely, the operation by the computer may be shortened by a factor of $10^8/10^{20000} \approx 1/10^{19992}$.

Other objects, features and advantages of the present invention will become apparent when reading the description of the embodiments of the present invention in conjunction with the accompanying drawings.

BRIEF DESCRIPTION OF THE DRAWINGS

FIG. 9 illustrates an initial meshing setting status and boundary contacting blocks.

DESCRIPTION OF THE PREFERRED EMBODIMENTS

The embodiments of the present invention are now explained with reference to the drawings. First, the planning problems to be solved by the present invention are explained and then the process contents conducted by the system of the embodiments are explained.

First, referring to FIGS. 3 to 10, the meshing planning problems (clustering problems) to be solved by the present invention are explained.

Figure 3:
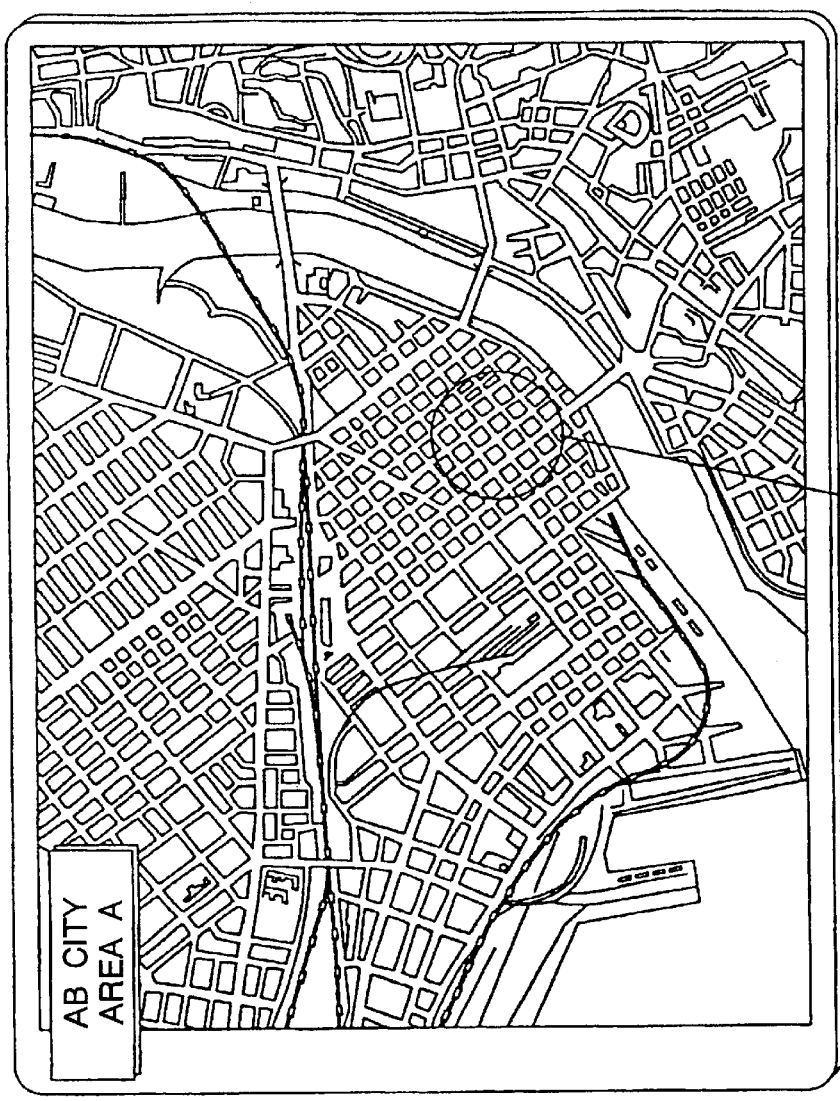
FIG. 3 shows an example of a city street map.
Figure 4:
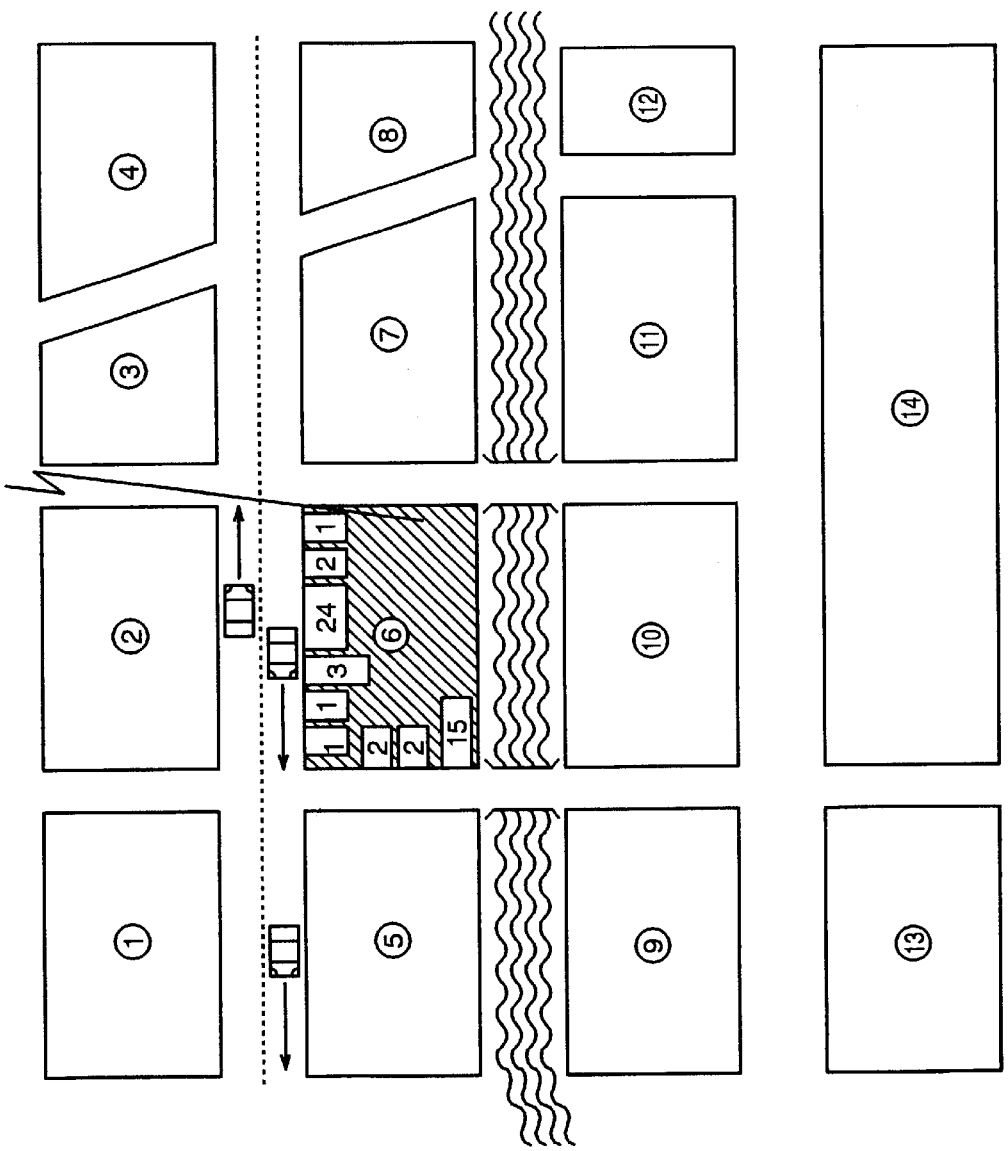
FIG. 4 illustrates an example of a minimum unit of planning.
Figure 5:
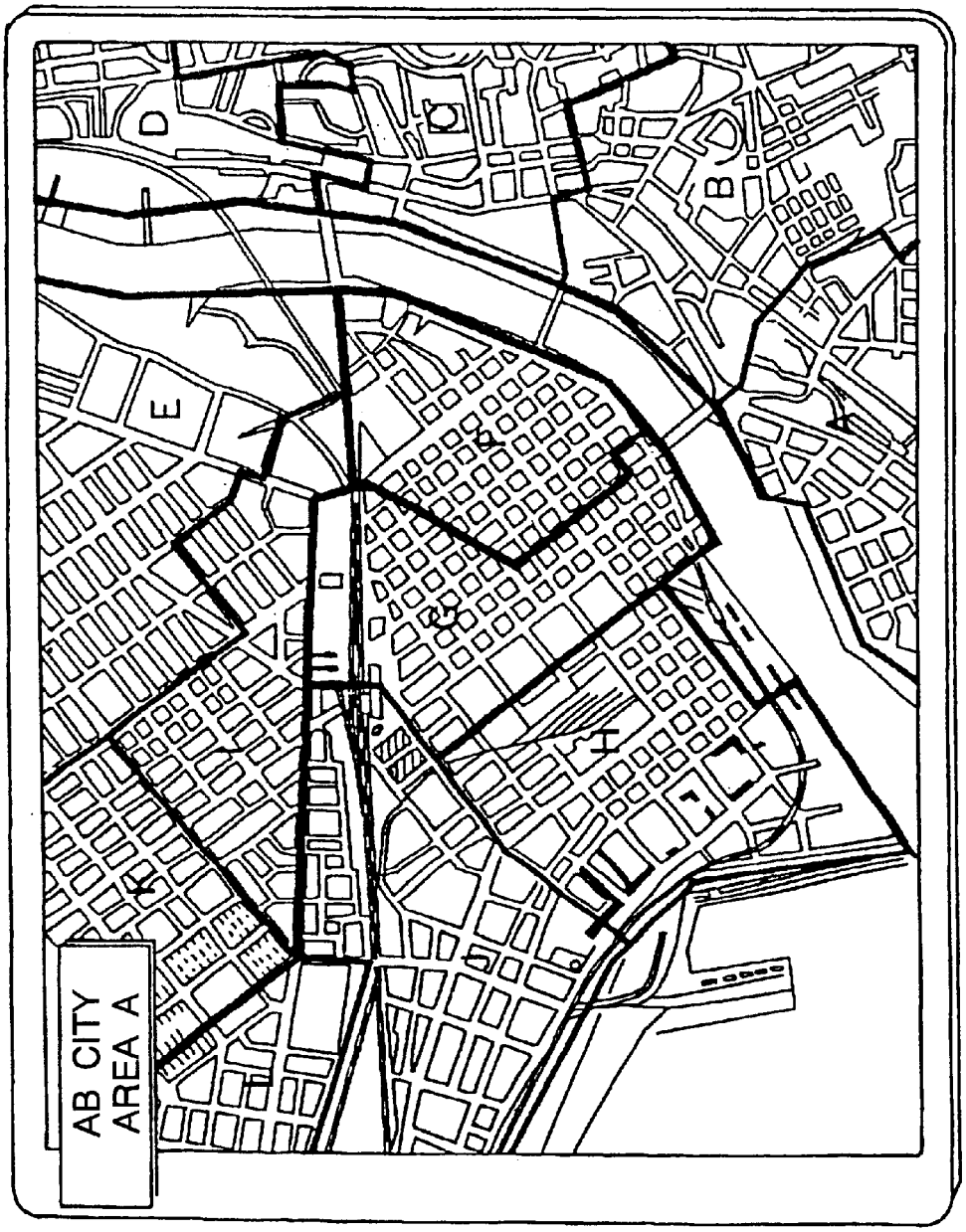
FIG. 5 shows an example of actual meshing.

FIGS. 3 to 5 show map information of area A of "AB City" which are examples of city road maps. Such maps may be obtained by referring to commercially available map sheets.

FIG. 4 shows a partial enlarged view of FIG. 3. An area surrounded by roads, rivers and mountains is called a block (street section) and it is defined as a minimum unit of meshing. More detailed unit which faces roads may also be used. In the present example, block having block numbers 1 to 14 are shown. Each block includes normal houses and large scale aggregations such as buildings and apartments.

A meshing plan for salesmen to visit the respective houses and aggregations is considered here. A work time required therefor comprises a work time A at visiting locations and a moving time B between blocks, and B may be divided into an absolutely necessary time C and a redundant moving time D. Namely, a work time $F_i$ of a salesman i may be represented by a formula (6):

$$Fi = \left(\sum_{j=1}^{m} Aj\right)i + Ci + Di \tag{6}$$

where m is a total number of visiting locations and it is simplified as being same independently from the visiting locations, and D represents a sum of distances of routes for moving in duplicate when the routes are planned by an Euler tour. In the following description, for the sake of simplification, an example in which the objective function $F_i$ of the plan consists only the visiting location work time and the absolute moving time is first considered, and an example which uses more complex composite function as described above will be explained finally as a direct application to an actual case.

Here, it is assumed $$Fi = \left(\sum_{j=1}^{m} Aj\right)i + Ci \tag{7}$$

where j is a block number which is in charge of the salesman i. For example, FIG. 4 indicates that there are 51 visiting locations in total.

FIG. 5 shows an example of meshing when the AB city is assigned to 12 salesmen. It is prepared by human while taking sizes of assigned areas and a density of the visiting locations into consideration. So long as it is observed on the map, it may be considered that it is averaged to some extent, but when detailed number of visiting locations and the absolute moving time are strictly considered, totals of the running time of the respective salesmen largely deviate from each other in many cases as shown in FIG. 6.

Figure 6:
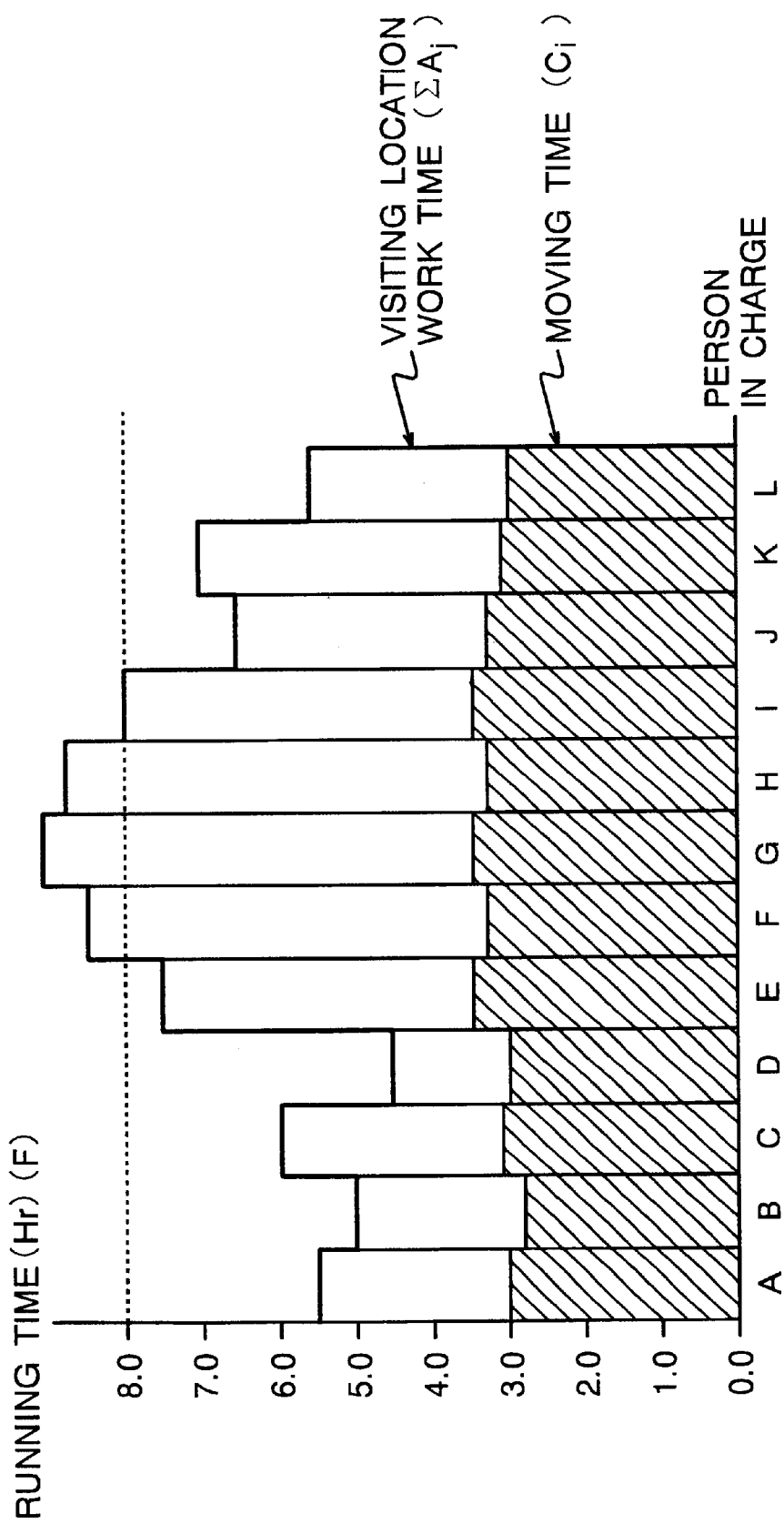
FIG. 6 shows a running time evaluation graph of FIG. 5.

In FIG. 6, an ordinate represents the running time and an abscissa represent the person in charge. A hatched area in a bar graph for each person in charge indicates the running time $C_i$ of the person in charge i. On the other hand, a blank area indicates the visiting location work time $(\Sigma A_j)_i$ of the person in charge i. While $C_i$ is averaged, $(\Sigma A_j)$ deviate from each other. As a result, the deviation is large in total and the work amounts largely differs among the persons in charge. Assuming that an upper limit of one-day work time is 8 hours, the persons other than F, G and H are relatively easy to work but the persons F, G and H have to work overtime.

Figure 7:
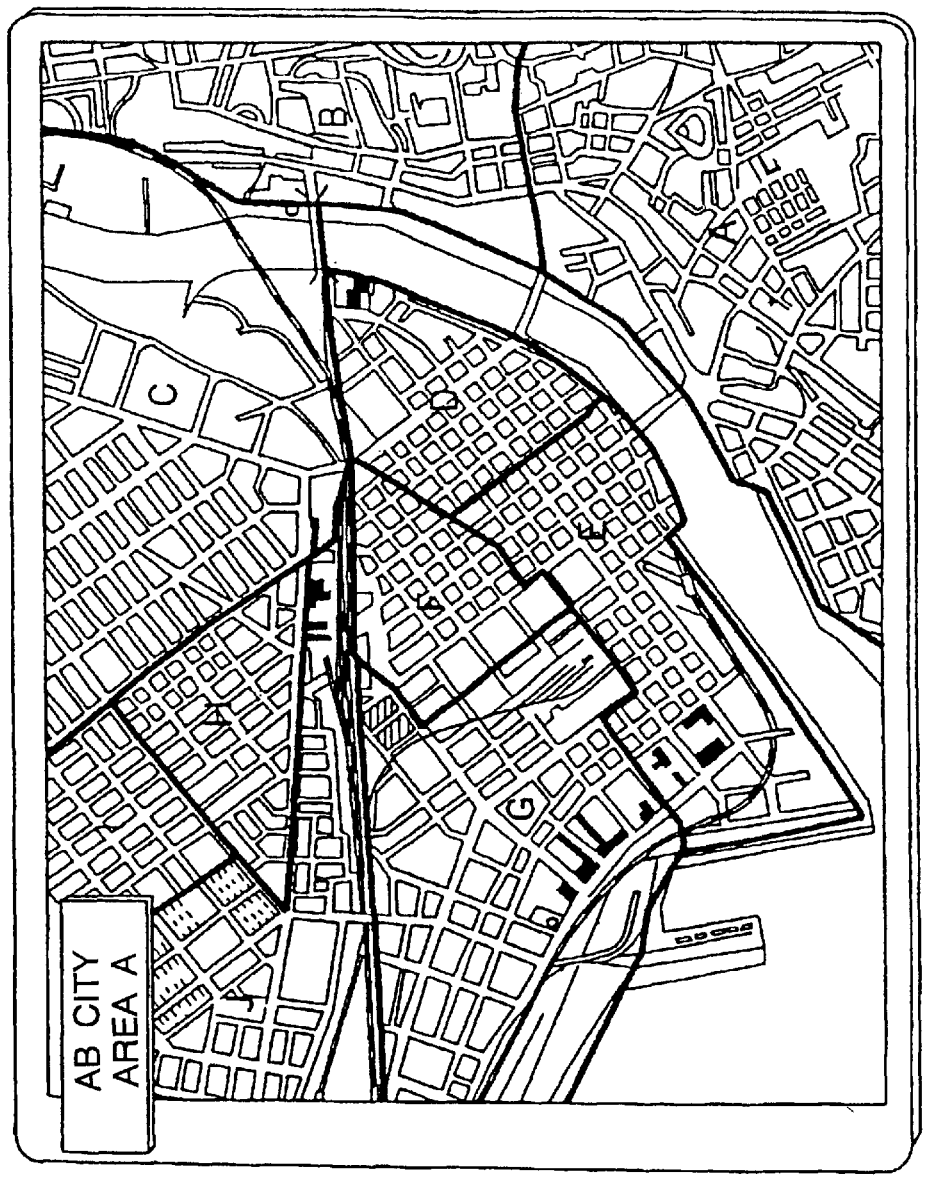
FIG. 7 shows an example of optimum meshing.
Figure 8:
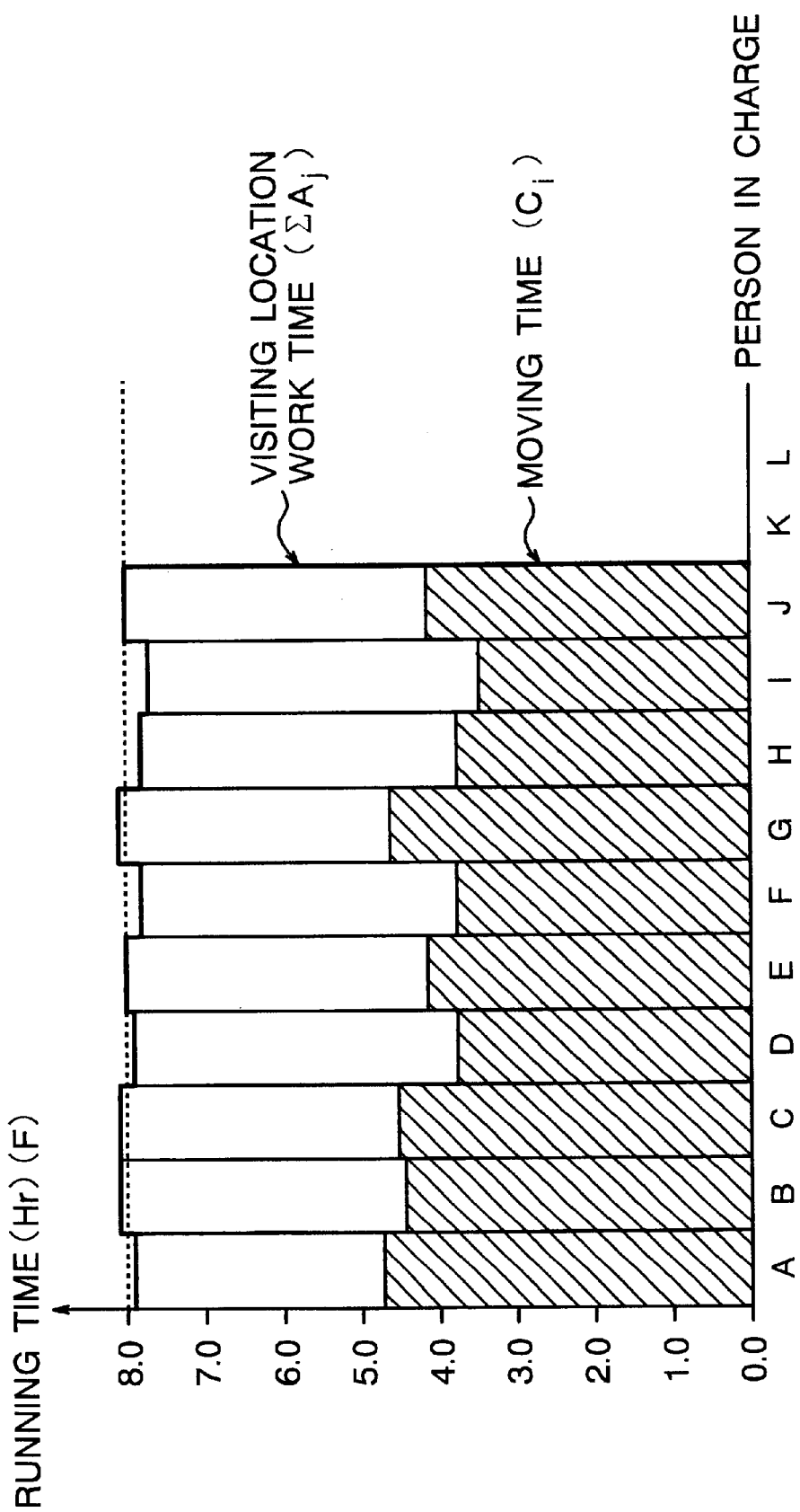
FIG. 8 shows a running time evaluation graph of FIG. 7.

On the other hand, FIG. 7 shows an example of an optimized meshing plan designed to make the works of individuals uniform within the upper limit of the running time. FIG. 8 shows a bar graph of the running time of each person in charge, while there are deviations for each moving time ($C_i$) and visiting location work time $(\Sigma A_j)_i$, the total running time $F_i$ is approximately 8 hours. As a result, two persons are reduced.

Figure 9:
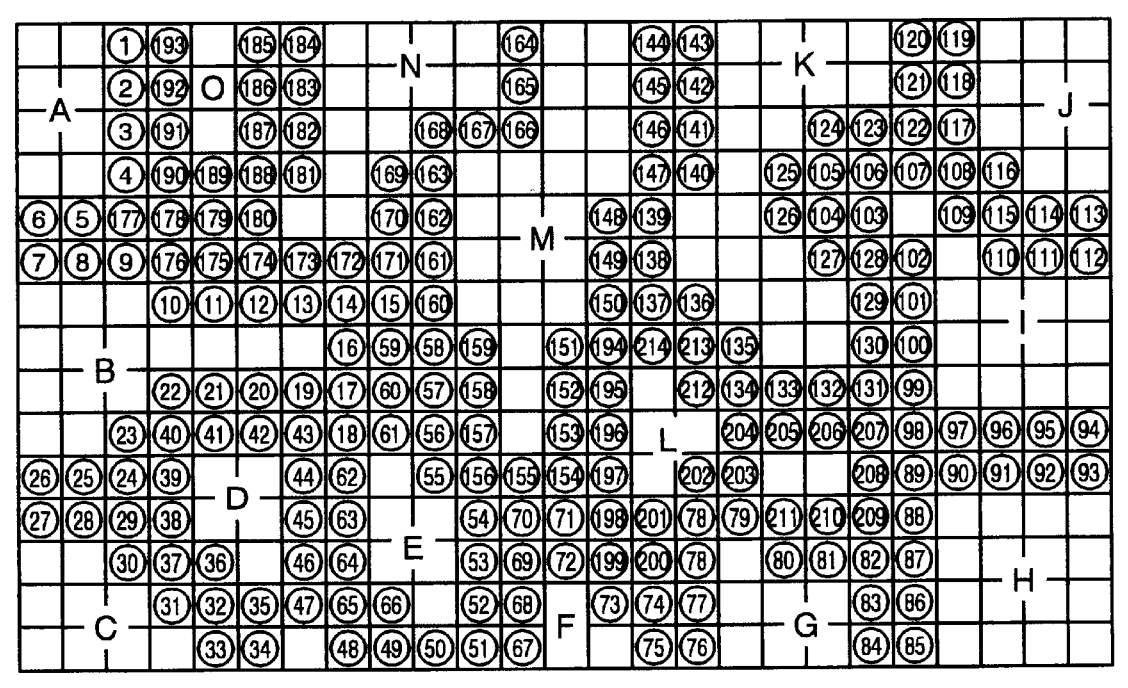
Figure 10:
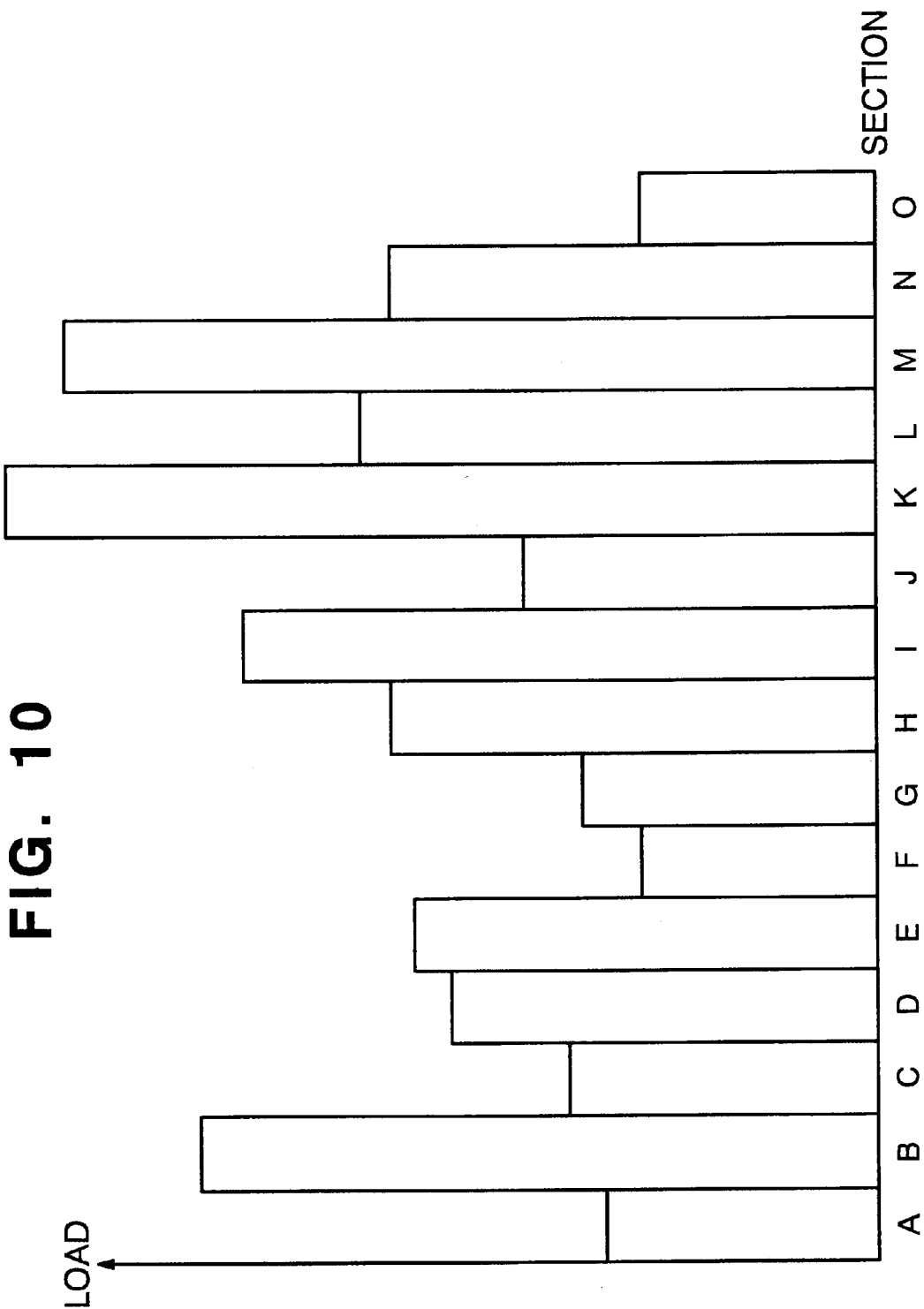
FIG. 10 shows a load distribution graph of FIG. 9.

In accordance with the present invention, the optimum meshing plan as described above may be obtained in a short time. For the sake of easy comprehension, FIG. 9 shows an example of a modeled map. Here, a minimum block of the plan is a square and a block name i (i=1~325) is assigned. It is assumed that in an initial state, 15 persons in charge are assigned as shown in FIG. 10 and thick lines indicate the areas therefor. Assuming that there is one visiting location for each block, the objective function is square of a standard deviation value of the work times for each person in charge. Namely, assuming that there is a visiting location, it is square of the standard deviation value of he work times for each person in charge. Namely:

$$F = \left( \sqrt{\frac{\sum_{j=1}^{N} (A - Aj)^2}{N}} \right)^2 = \sum_{j=1}^{N} (\overline{A} - Aj)^2 / N \tag{8}$$

where $\overline{A}$ is a mean value of $A_j$ (j=1~N), N is a divisor or the number of persons in charge.

The loads of the respective persons in charge largely deviate as shown in FIG. 10.

Figure 1:
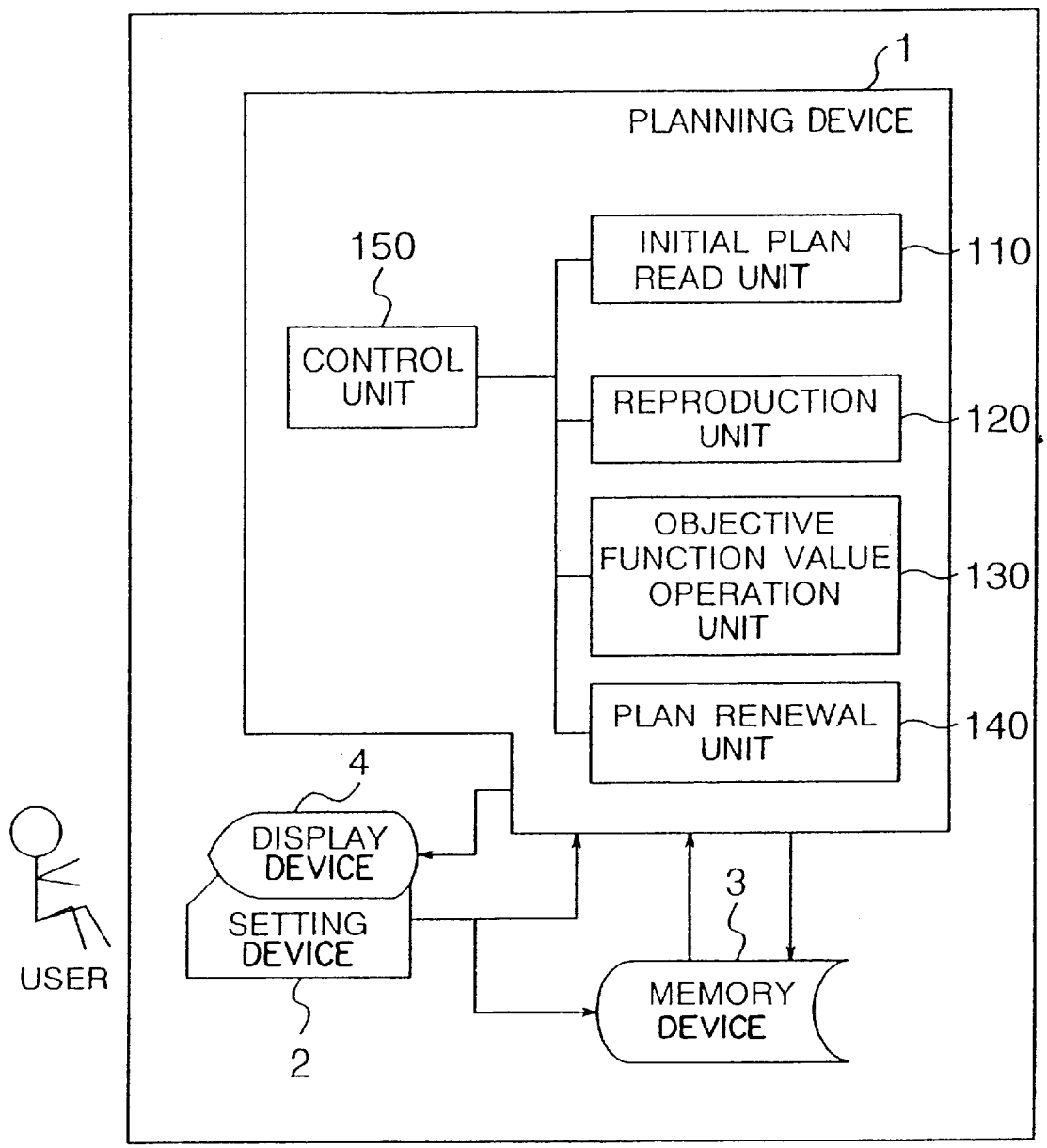
FIG. 1 shows a configuration of a meshing planning system in accordance with the present invention.
Figure 2:
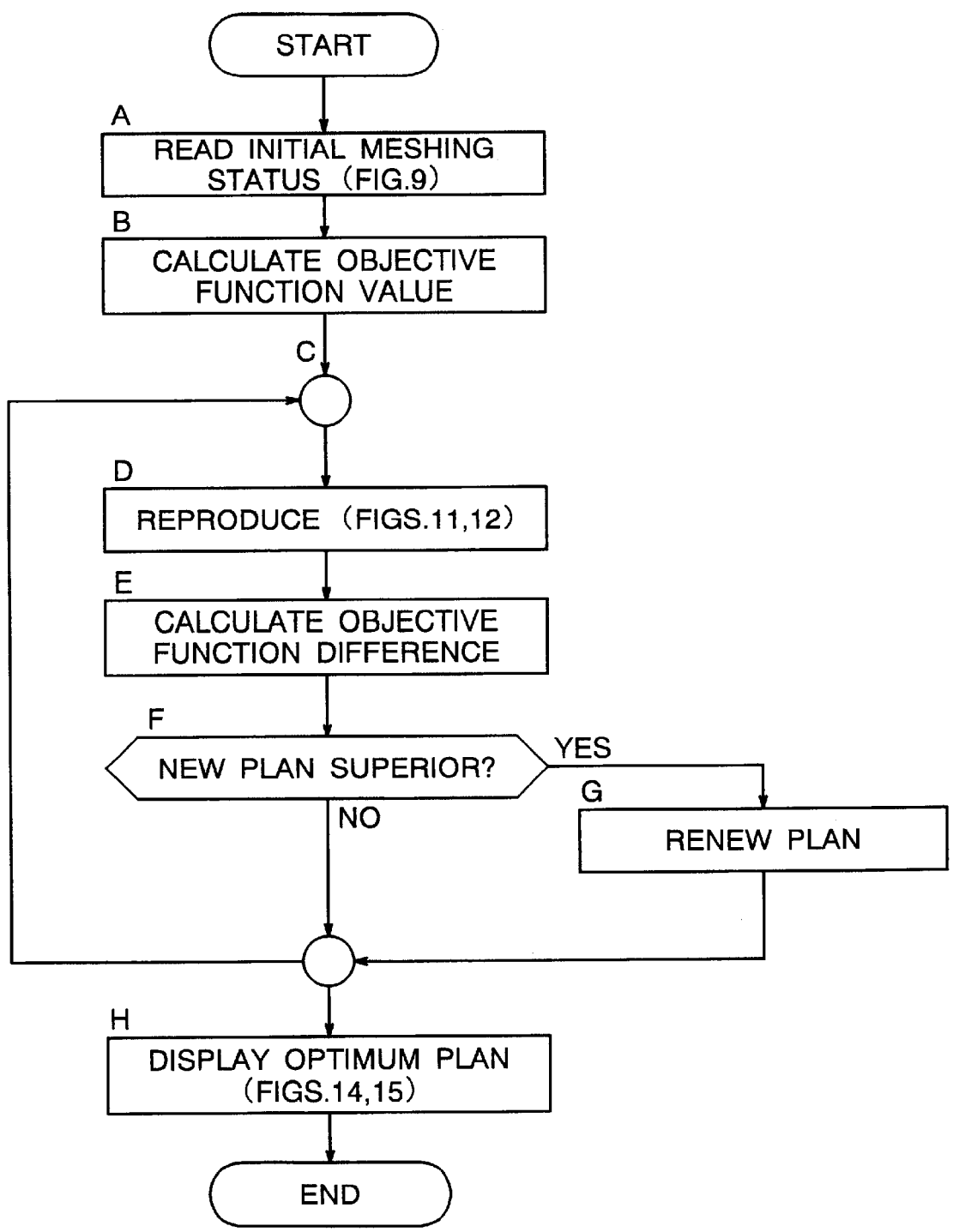
FIG. 2 shows an example of a process conducted by the planning device of FIG. 1.
Figure 11:
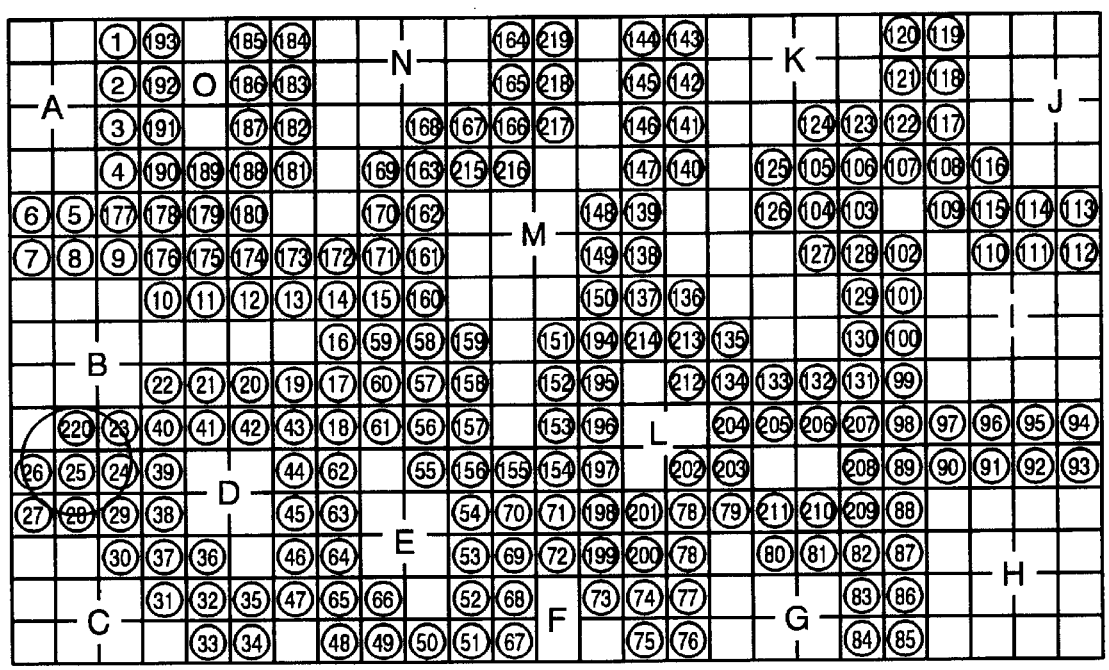
FIG. 11 illustrates a meshing status after section exchange and boundary contacting blocks.

Referring to FIGS. 1, 2 and 11 in sequence, the configuration of the planning system for achieving the present invention and the content of the process conducted by the system are explained.

First, FIG. 1 shows a configuration of the mesh planning system of the present invention. The present system comprises a planning device 1, a setting device 2, a memory device 3 and a display device 4.

The planning means 1 is means for preparing an optimum meshing plan and comprises an initial plan read unit 110 for reading out a previously prepared initial plan, reproduction unit 120 for selecting one element from a set composed by elements which contact to boundary planes of respective divided subsets by a random number having an equal-opportunity-selectable distribution, equal-opportunity-selecting one of the subsets to which the selected element contacts and scheduling the plan such that the selected element is rendered to belong to the selected subset, an objective function value operation unit 130 for calculating an objective function value of the initial plan, plan renewal unit 140 for replacing the previously plan by the current plan to sequentially define an optimum plan candidate when the objective function value of the previous plan is smaller than the objective function value of the new plan and a control unit 150 for starting the reproduction unit, the objective function value operation unit and the plan renewal unit by a predetermined number of times and controlling to display a final optimum plan on the display device 4.

The planning device 1 may be realized by an electronic device such as CPU, ROM, RAM and various logic circuits, that is, a computer having a logic and operation function and capable of executing an installed program. Here, the objective function is a variation of work times of the respective persons in charge, that is, a standard deviation value although it is not limited thereto. For example, it may be a summation of distances of redundant routes of the Euler tour.

The setting device 2 has at least a function to accept a problem of a given plan and a function to accept variables and constants necessary for the planning. For example, it may be realized by a keyboard or a pointing device such as a mouse.

The memory device 3 stores at least the problems (FIG. 9) given through the setting device 2 and constants and condition data used for the planning. For example, it may be realized by a semiconductor device such as a RAM or a storage device such as a disk drive. A specific example will be explained later. It may be a memory unit to store the optimization constants such as random number.

The display device 4 has at least a function to display the result of the planning obtained by the planning device 1. For example, it may be realized by a CRT, a liquid crystal display or an EL display. Specifically, it is used to display the meshing status and the evaluation result obtained by the planning device 1.

FIG. 2 illustrates process device (process steps) conducted by the planning device 1. FIG. 9 is specifically referred to illustrate the process.

In a step A of FIG. 2, the given initial meshing information shown in FIG. 9 is read from the memory unit 3. As a form of the information, the block numbers assigned to the respective persons in charge may be sorted.

In a next step B, the objective function value is calculated. Here, the objective function F is square of the standard deviation value as described above. namely, it is given by:

$$F = \left( \sqrt{\frac{\sum_{j=1}^{N} (A - Aj)^2}{N}} \right)^2 = \sum_{j=1}^{N} (\overline{A} - Aj)^2 / N \tag{8}$$

where $\overline{A}$ is a mean value of $A_j$ (j=1~N), N is a divisor or the number of persons in charge.

$$A = \sum_{j=1}^{N} (Aj)/N \tag{9}$$

Next, in a step C, control is made such that the process of steps D, E, F and G is repeated by a sufficient number of times. Practically, the repetition of $M \times N^2$ times is sufficient.

In a step D, a minimum change is applied to the current plan $L_i$. It is conducted by a very simple finding method as shown in FIG. 11. Namely, a set $S_d$ of blocks $$S_d=(1, 2, 3, \ldots, 219)$$

which contacts to the boundaries of the areas assigned to the respective persons in charge is extracted and one of the elements of $S_d$ is defined or selected by random numbers which equal-opportunity-distribute for the number of elements. Here, 25 random numbers are included for 219 blocks. The change may be applied to the mesh to which the block 25 belongs, at an equal probability. The example of FIG. 11 indicates that the block 25 has been moved from the person B to C. Namely, it indicates that the number of blocks of the person C has been increased by one and the number of blocks of the person B has been reduced by one.

Figure 12A:
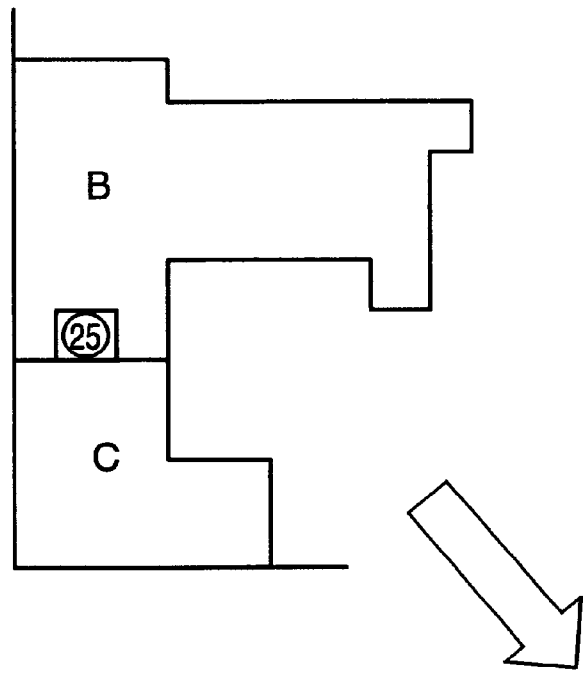
FIGS. 12A and 12B illustrate an example of meshing reproduction.
Figure 12B:
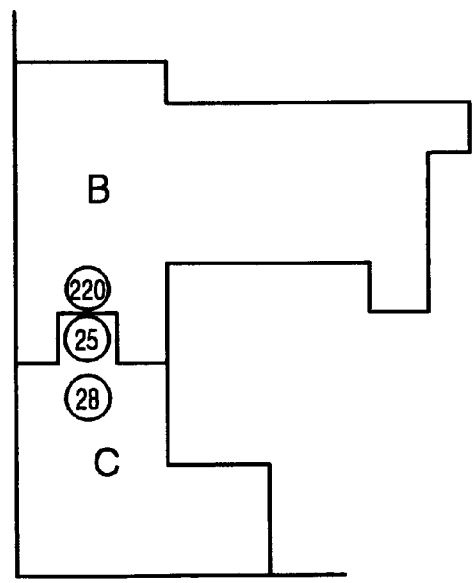

FIGS. 12A and 12B show this status in enlargement. FIG. 12 shows that before the movement of the block 25 and FIG. 12B shows that after the movement. Since the boundary line has been changed, the block 28 is now non-contacting block and the block 220 is a new contacting block.

Figure 13:
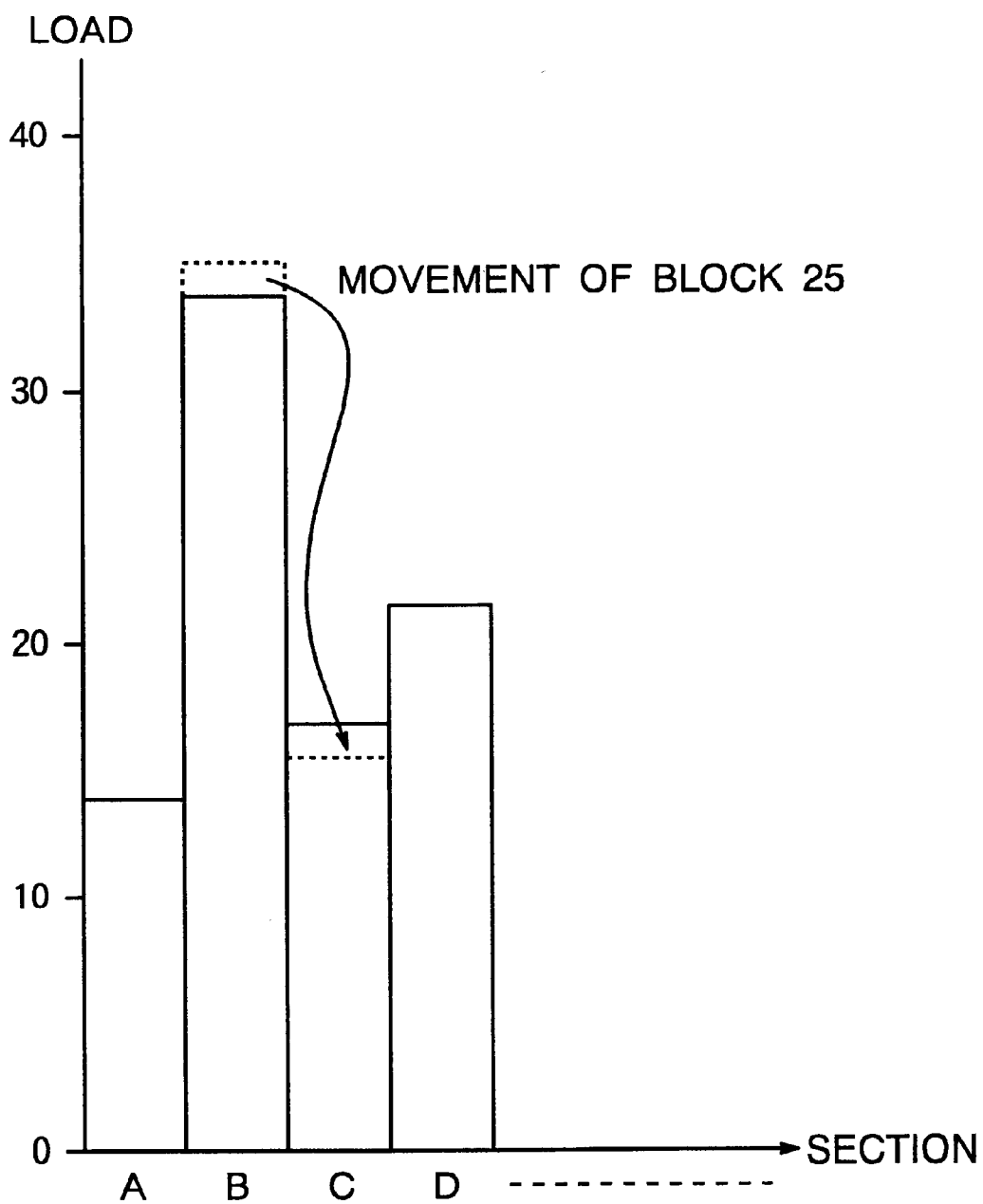
FIG. 13 illustrates a status of load averaging by the reproduction.

FIG. 13 shows a change of the load by the above transition. Since the load of the person B was large and the load of the person C was small, the load has been averaged in total by the movement of the block 25.

In a step E, a difference between the objective function value of the previous plan $L_{i-1}$ and the objective function of the current plan $L_i$ is calculated. Then, in a step F, the superiority of the new plan is determined.

If an objective function point $(F_{i-1} - F_i)$ calculated in the step E is positive, namely, if $F_{i-1} > F_i$, it is apparent that the new plan is superior and $L_i$ is updated as the optimum solution candidate. It is referred to as the optimum solution OPT.

$$OPT \leftarrow L_i$$

This is a process in a step G. In the step F, the difference between $F_{i-1}$ and $F_i$ is simply determined, but a local solution may be reached if this process only is used. A method for avoiding it will be discussed later.

Returning back to the step E, the difference $\Delta F$ of the objective functions of the new plan $L_i$ and the previous plan $L_{i-1}$ generated by the above transition is $$-\Delta F = F_{i-1} - F_i$$

Since $\Delta F$ is defined as square of the deviation as described above, $$-\Delta F = \sum_{j=1}^{N}(\overline{A} - A_j^{i-1})^2 / N - \sum_{j=1}^{N}(\overline{A} - A_j^{i})^2 / N \qquad (10)$$

It largely depends on N and M (total number of blocks) and the process time increases. In the present invention, however, since the minimum change is given as shown in FIGS. 11 and 12, the meshing of the persons other than the persons B and C does not change at all. Accordingly, $\Delta F$ may be obtained by a simple calculation as described below.

$$F_{i-1} = (\overline{A} - A_1^{i-1})^2 + (\overline{A} - A_2^{i-1})^2 + \ldots + (\overline{A} - A_N^{i-1})^2$$

$$F_i = (\overline{A} - A_1^{i})^2 + (\overline{A} - A_2^{i})^2 + \ldots + (\overline{A} - A_N^{i})^2 \qquad (11)$$

Since A is same for $F_{i-1}$ and $F_i$ and $A_j$ does not change for other than the persons B and C, $$-(F_{i-1} - F_i) = \left((\overline{A} - A_B^{i-1})^2 + (\overline{A} - A_C^{i-1})^2\right) - \qquad (12)$$

$$\left((\overline{A} - A_B^{i})^2 + (\overline{A} - A_C^{i})^2\right)$$

$$= \overline{A}^2 - 2\overline{A} \cdot A_B^{i-1} + (A_B^{i-1})^2 +$$

$$\overline{A}^2 - 2\overline{A} \cdot A_C^{i-1} + (A_C^{i-1})^2 -$$

$$\left(\overline{A}^2 - 2\overline{A} \cdot A_B^{i} + (A_B^{i})^2 +\right.$$

$$\left.\overline{A}^2 - 2\overline{A} \cdot A_C^{i} + (A_C^{i})^2\right)$$

$$= (A_B^{i-1})^2 + (A_C^{i-1})^2 - 2\overline{A}(A_B^{i-1} + A_C^{i-1}) -$$

$$\left((A_B^{i})^2 + (A_C^{i})^2 - 2\overline{A}(A_B^{i} + A_C^{i})\right)$$

Since $$(A_B^{i-1} + A_C^{i-1}) \text{ and } (A_B^{i} + A_C^{i}) \qquad (13)$$

do not change, $$-\Delta F = (A_B^{i-1})^2 + (A_C^{i-1})^2 - ((A_B^{i})^2 + (A_C^{i})^2) \qquad (14)$$

Assuming that a source location of the block is B and a destination location is C, the number of blocks of movement is 1. Thus, $$A_B^{i} = A_B^{i-1} - 1$$

$$A_C^{i} = A_C^{i-1} + 1 \qquad (15)$$

Thus, $$-\Delta F = (A_B^{i-1})^2 + (A_C^{i-1})^2 - \left((A_B^{i-1} - 1) + (A_C^{i-1} + 1)^2\right) \qquad (16)$$

$$= +2A_B^{i-1} - 1 - 2A_C^{i-1} - 1$$

$$= 2(A_B^{i-1} - A_C^{i-1} + 1)$$

Namely, it is seen that when the block to be moved is moved from a large load section to a small load section, it is apparent that the averaging is conducted. Accordingly, in the step D, it is determined whether $$-(A_B^{i-1} - A_C^{i-1} + 1) \qquad (17)$$

is negative or not. Namely, in the step E, whether a sum of the evaluation value of the transition source section and the change amount is larger than the evaluation value of the transition destination or not is determined. If this condition is met in the step F, the process proceeds to the step G to renew the plan. Otherwise, the process proceeds to a step H.

Since the process which depends on the number of sections (divisor) N and the number of elements M is not included in the steps D, E, F and G which are to be repeated, it does not depends on the magnitude of the problems to be solved.

However, since it is apparent that the above transition extends to the entire system, the optimum solution is reached after sufficient repetition.

In this case, it is considered that the complexity of the problem is the number of elements of the set of blocks $S_d$ which contacts to the boundary. When the elements of the problem to be solved are relatively equal-opportunity-distributed, it is considered that the mean value of the numbers of elements is:

$$(N+1) \times \sqrt{M}$$

Accordingly, since it has been proved that the change considered here may be local and for the problem given in the minimum unit, the optimum solution or one sufficiently close thereto may be reached by repeating by square times of the number of elements to be changed, the number of times of repetition in the step C may be practically given by a function O (N, M) of N and M. Namely, $$O(N, M) = \left((N+1) \times \sqrt{M}\right)^2 \qquad (18)$$

$$\approx N^2 \times M$$

For example, even for a large scale problem having N=100 and M=10000, $$O(N,M) = (100)^2 \times 10000 = 10^8$$

may be sufficient. As described above, since the steps D, E, F and G do not depend on N and M, it is apparent that the solution may be obtained in the order of seconds to minutes when the today's relatively high speed computer.

Figure 14:
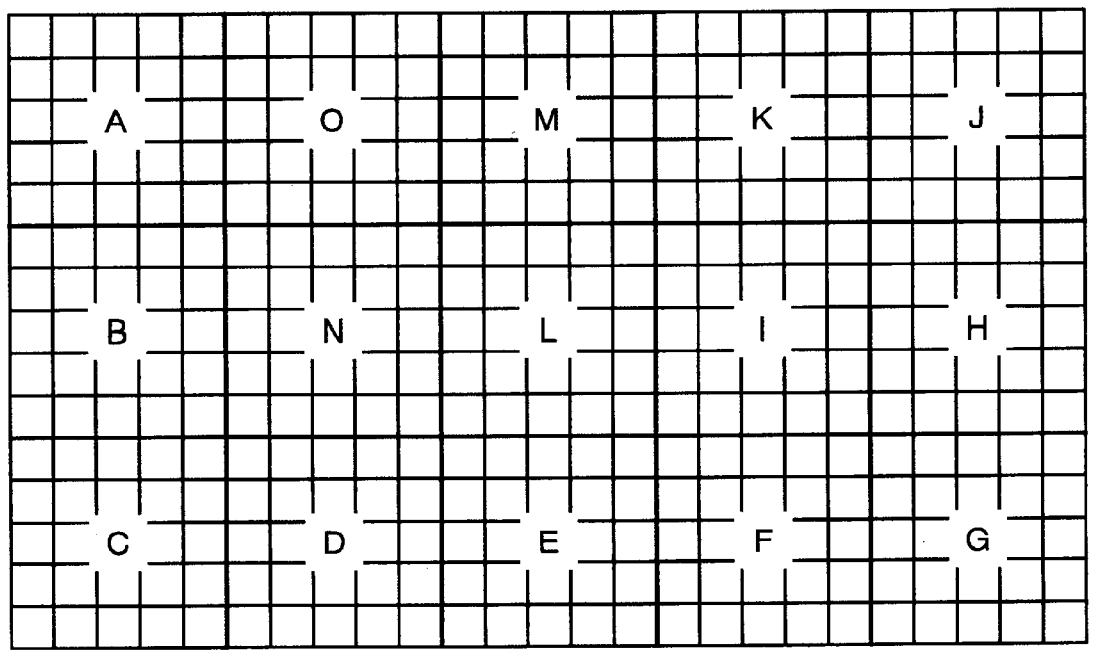
FIG. 14 illustrates a result of optimization.

FIG. 14 shows an example of the result of the planning prepared by the process of FIG. 2. In the present example, since N=15 and M=375, the number of times of repetition is $$N^2 \times M = 15^2 \times 375 = 84375 \text{ (times)}$$

A plurality of plans having the same objective function value are obtained but a practical solution may be obtained by repeating by the order of the above number of times.

Figure 15:
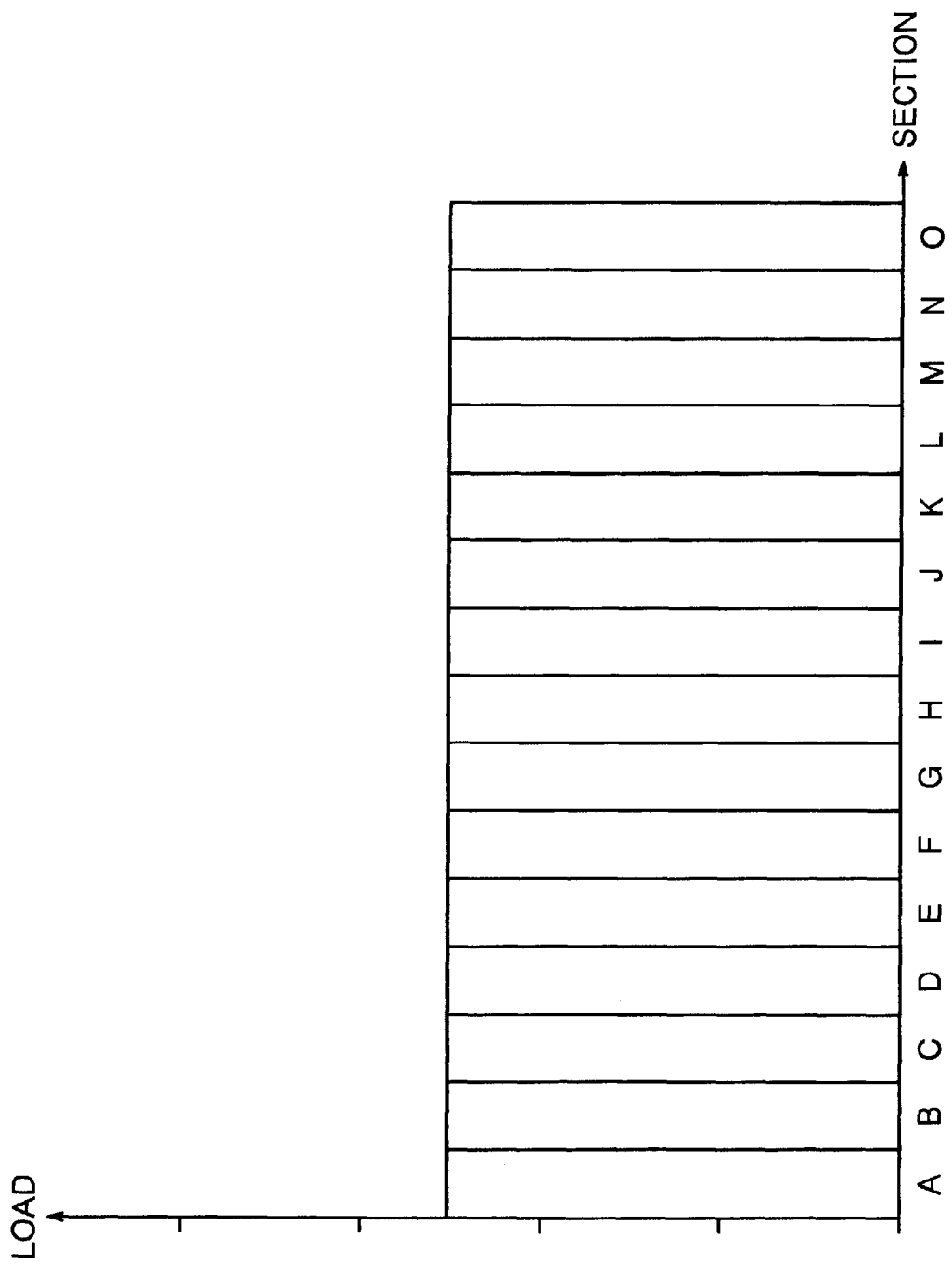
FIG. 15 shows a load distribution graph of FIG. 14.

FIG. 15 shows an evaluation of FIG. 14. It is seen that the averaging has been conducted completely.

A sufficiently good solution may be obtained by the above configuration and process but in the above method, a local solution might be reached. An affective embodiment to avoid such a problem is explained with reference to FIGS. 16, 17 and 18.

In the step E of FIG. 2, the difference between the evaluation of the previous plan $F_{i-1}$, and the current plan $F_i$ $$\Delta F = -(A_B^{i-1} - A_C^{i-1} + 1) \quad (19)$$

is calculated as described above. In the previous description, this process (steps F and G) is placed as the optimum solution candidate only when $\Delta F$ is negative.

Figure 16:
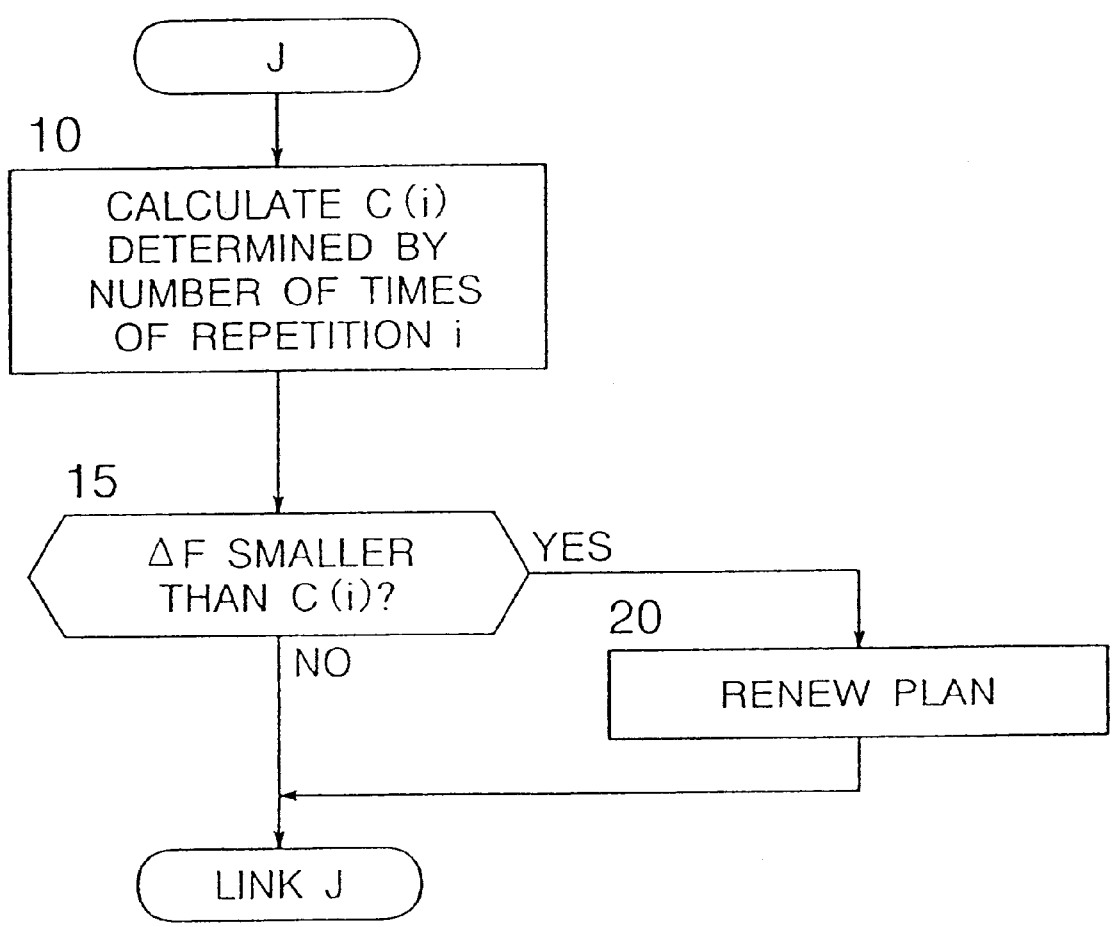
FIG. 16 illustrates another process conducted by the planning device of FIG. 1, FIGS. 17A and 17B illustrate transition of an optimization constant and a distribution area of a preset number C(i)

By modifying this process (steps F and G) as shown by a process flow of FIG. 16, the reach to the local solution may be avoided. First, in a step 10, $$C(i) = (C_1 \cdot a(i))/\log(i+2)$$

which is determined by the number of times of repetition i is calculated, where $C_1$ is a constant determined by a problem of the object, a(i) is random number equalopportunity-distributed between 0.0 and 1.0 and log is a natural logarithm.

Figures 17A, 17B:
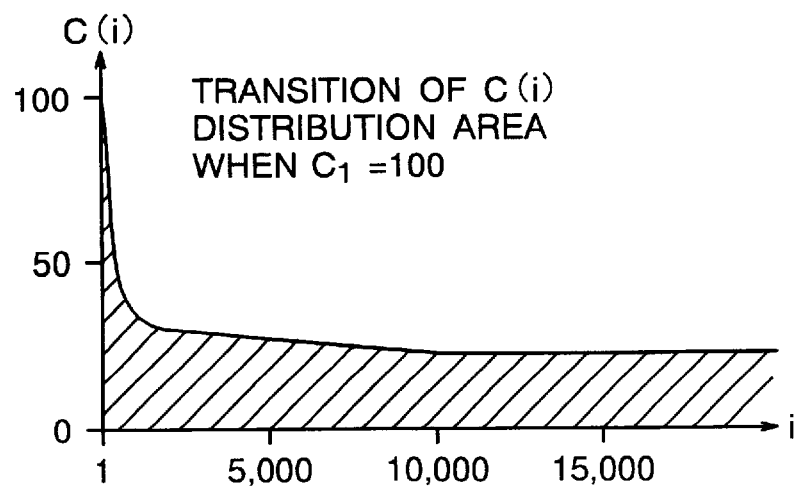

FIG. 17B shows by hatching a value range which C(i) may assume, where an abscissa represents the number of times of repetition i and $C_1=100$. Namely, C(i) is a value equal-opportunity-distributed in the value range and decreases as C(i) increases. For example, a specific value as shown in FIG. 17A may be previously defined.

In a step 15 of FIG. 16, C(i) and $\Delta F$ are compared. If C(i) is smaller than $\Delta F$, the plan renewal process of the step 20 is conducted.

Figure 18A:
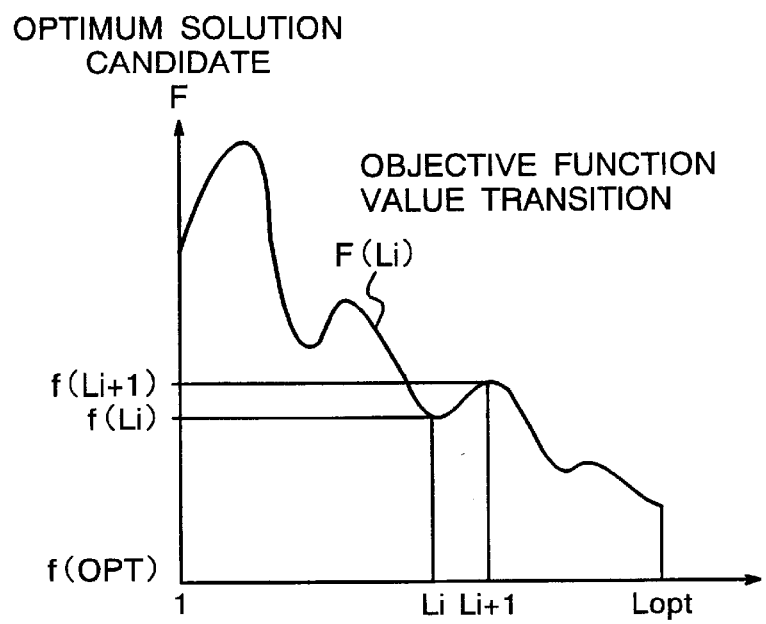
FIGS. 18A and 18B show a transition graph of an objective function value and an objective function value deviation.
Figure 18B:
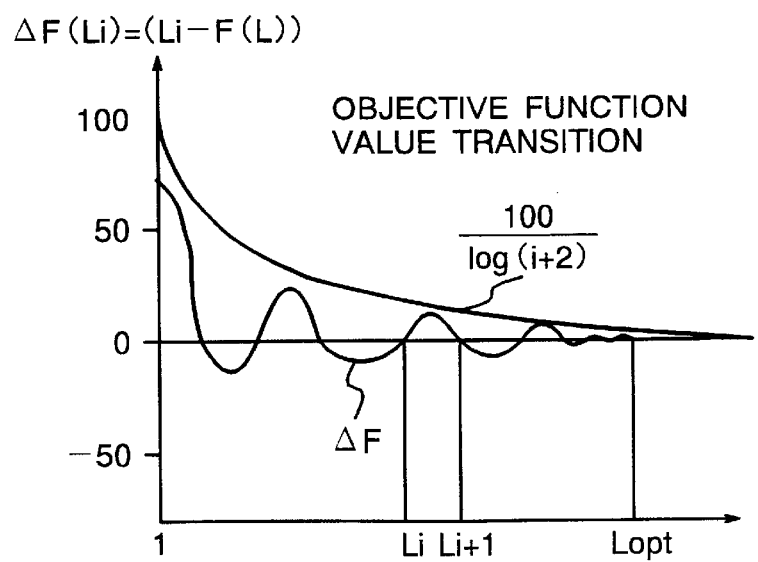

FIG. 18A shows a transition of the objective function value $F(L_i)$ of the optimum solution candidate $L_i$ when the plan is renewed in this manner. FIG. 18B is a differentiation of the objective function value $F(L_i)$ by i, namely the objective function value difference $\Delta F(L_i)$. $\Delta F(L_i)$ is a function which indicates a transition which exhibits a damped oscillation in a range smaller than C(i) described above and it finally converge to zero. Namely, when the optimum solution $L_{opt}$ is reached, $\Delta F$ is zero and does not change.

In this manner, even if the objective function value becomes bad, the process may be directed toward the optimum solution without stopping at the local solution by replacing the optimum solution candidate.

The method of the present embodiment may be achieved by slight amount of addition and subtraction for the method described before and the process times are of the same order because it is the procedure which does not depend on N and M. Hence, it is preferable to adopt this method in practice.

Figure 19:
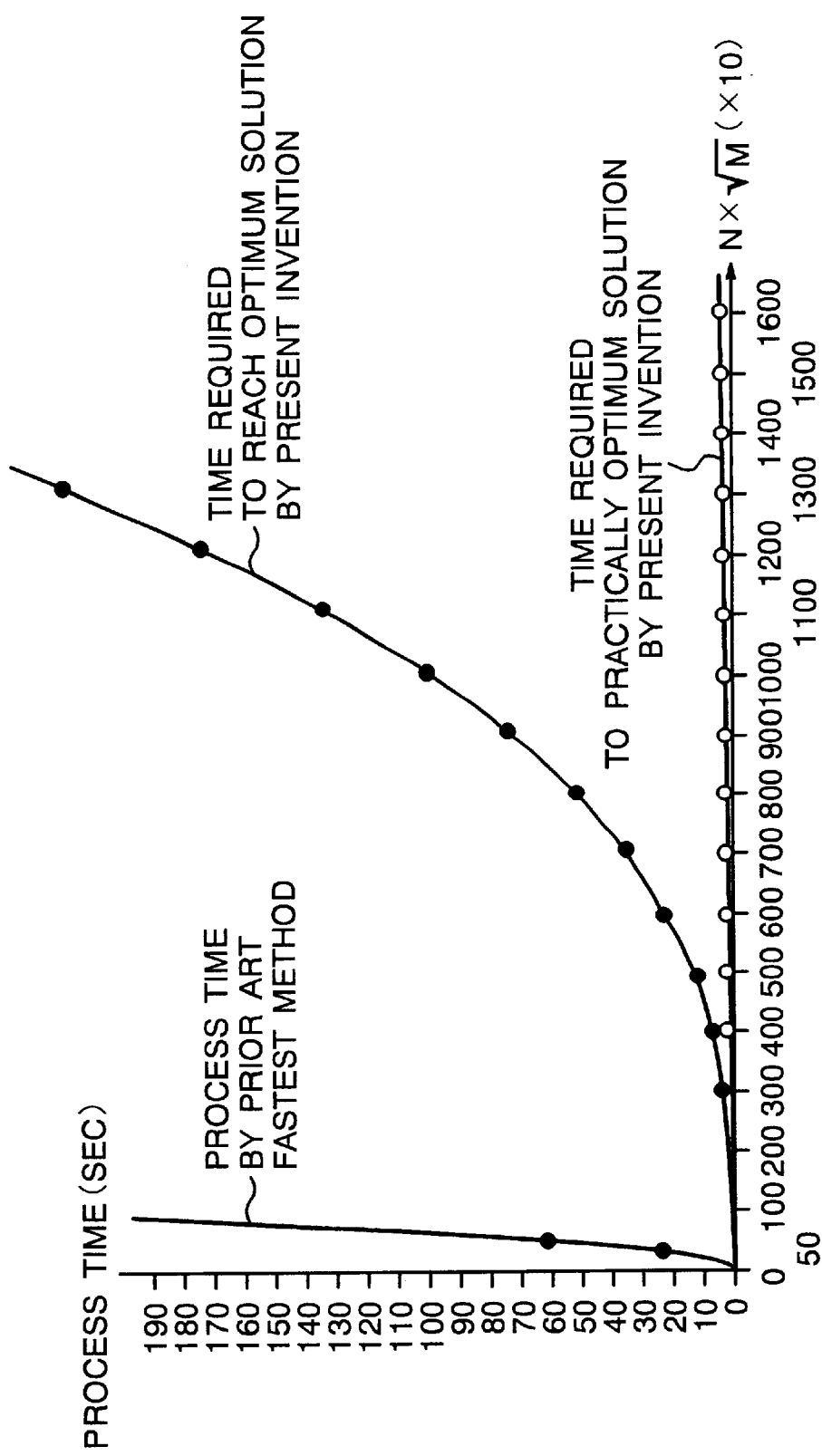
FIG. 19 illustrates a relation between the number for optimization and a process time.

FIG. 19 shows a plot of the process time required to obtain the optimum solution or the practically optimum solution when a product of the divisor which is the number of objects for optimization and a square root of the number of elements $\sqrt{M}$ is changed, when the above system is applied to solve the problem shown in FIG. 5. For the purpose of comparison with the prior art, the process time to obtain the practically optimum solution by the prior art fastest method is shown on the same graph. The practically optimum solution is not the optimum solution itself but it means a solution which meets practical allowable conditions.

The process here used a computer having a capability of 1000 MIPS (a process performance which can execute $10^9$ instructions per second).

In the prior art method, for example, in a method similar to an enumeration method, when $N \times \sqrt{M}$ is approximately 600 (for example, divisor N=6, the number of elements M=10000), a huge process time is required. In accordance with the present invention, it may be solved in one second. For a large scale problem such as $N \times \sqrt{M}$ is 8,000 (for example, N=40, M=40,000), a solution may be obtained in approximately 50 seconds by the system of the present invention. A practically optimum solution may be obtained in a short time eve for larger N and M.

In the experiment here, the random break of the solution which has been previously determined as optimum and the reconstruction thereof are referred to as the optimum solution. Accordingly, it should be noted that the process time changes in accordance with the optimization level of the initial solution.

Assuming that, in the common meshing problem, the load averaging of 10000 blocks to approximately 100 persons is a substantially large scale, the optimum solution may be obtained in a short time in accordance with the present invention without using a large scale computer.

In accordance with the present invention, the optimum plan for the optimum meshing (clustering) problem may be obtained at a high speed with a simple system configuration.

As described hereinabove, in accordance with the present invention, a scheme to obtain the optimum or practically optimum meshing information for the given meshing (clustering) problem at a high speed by a simple system configuration is provided. Namely, the planning system and planning method which, in distributing and collecting articles and the visit for inspection of the meters, can obtain a solution which makes uniform the weights of the subsets divided by the given divisor such as areas, weights and work amounts, for the problem of the assigned area at a high speed with a simple configuration are provided.

Further, in accordance with the present invention, the planning system and planning method which can dynamically obtain a solution which makes uniform the weights of the subsets divided by the given divisor for the problem of the assigned area with a simple configuration and can reach the optimum solution at a high speed are provided.

What is claimed is:

1. A planning system for dividing an object continuously composed by a plurality of elements having weights by a given divisor and determining a solution by planning for a problem to average total values of the weights of respective divided subsets, comprising planning means for preparing an objective function representing items to be averaged and designing a plan to minimize the value of the objective function, and memory means for storing at least variables necessary for designing the plan; said planning means comprising:

objective function value operation means for calculating an objective function value of an initial plan;

reproduction means for generating random numbers to a set composed by elements contacting to boundary planes of the divided subsets, said random numbers having a range of number of contacting elements and an equally-opportunity-selectable distribution, for selecting at least one element based on said random numbers, for equally-opportunity-selecting one of the subsets to which said element contacts and scheduling the plan such that the selected element is rendered to belong to the selected subset; and plan renewal means for comparing the objective function value for the previous plan and the objective function value for the new plan, and sequentially determining the plan having a smaller objective function value as an optimum plan candidate.

2. A planning system for dividing an object continuously composed by a plurality of elements having weights by a given divisor and determining a solution by planning for a problem to average total values of the weights of respective divided subsets, comprising setting means for accepting at least the object of the problem and variables necessary for solving the problem, planning means for preparing an objective function representing items to be averaged in said problem and designing a plan to minimize the value of the prepared objective function, memory means for storing at least variables necessary for designing the plan and display means for displaying a result of the planning; said planning means comprising:

initial plan read means for reading an initial plan;

objective function value operation means for calculating an objective function value of said initial plan;

reproduction means for generating random numbers to a set composed by elements contacting to boundary planes of the divided subsets, said random numbers having a range of number of contacting elements and an equally-opportunity-selectable distribution or a normal distribution, selecting at least one element based on said random numbers, equal-opportunity-selecting one of the subsets to which said element contacts and scheduling the plan such that the selected element is rendered to belong to the selected subset;

plan renewal means for comparing the objective function value for the previous plan and the objective function value for the new plan, and sequentially determining the plan having a smaller objective function value as an optimum plan candidate; and control means for controlling starting said objective function value operation means, said plan renewal means and said reproduction means a predetermined number of times, and controlling a visual display of a final optimum plan on said display means; and wherein said plan renewal means replaces the previous plan by the new plan as the optimum plan candidate, when the objective function value for the new plan is smaller than the objective function value for the previous plan.

3. A planning system according to claim 2 wherein said objective function value operation means calculates the following formula representing a standard deviation of weights of the elements of the divided subsets as the objective function value:

$$\sqrt{\sum_{i=1}^{n}(\overline{X}-x_i)^2/n}$$

where n is a divisor, $x_i$ is a summation of weights of the elements of i-th divided set, and $\overline{X}$ is a mean value from $x_1$ to $x_n$.

4. A planning system according to claim 2 wherein said objective function value operation means comprises means for calculating a difference between a difference between summations of weights of at most two unaltered subsets and a difference between those of at most two altered subsets as the objective function value.

5. A planning system according to claim 2 wherein said plan renewal means, when sequentially determining the optimum plan candidate, compares a difference between the objective function plans in the previous plan and the new plan and a variable C(i) predetermined for each number of times of planning i, and when the difference between the objective function values is smaller than the preset variable C(i), replaces the previous plan by the current plan to determine it as the optimum plan candidate.

6. A planning system, comprising:

an input device which accepts at least a given planning problem and values of variables required to solve the given planning problem;

a display device which provides a visual display of an optimum plan obtained for the given planning problem; and a planner device which prepares an objective function representing items to be averaged and designs a plan to minimize a value of the objective function, said planner device comprising:

an initial plan reader which reads an initial plan;

an objective function value operation unit which calculates an objective function value of said initial plan;

a reproduction unit which generates random numbers to a set composed by elements contacting to boundary planes of divided subsets, said random numbers having a range of number of contacting elements and an equally-opportunity-selectable distribution, selecting at least one element based on said random numbers, equal-opportunity-selecting one of the subsets to which said element contacts, and scheduling the plan such that the selected element is rendered to belong to the selected subset;

a plan renewal unit which compares the objective function value of the current plan with the objective function value of the previous plan to determine the plan having a smaller objective function value as an optimum plan; and a control unit which provides a visual display of an optimum plan on said display device.

7. The planning system according to claim 6, wherein said objective function value operation unit obtains said objective function value using the following formula representing a standard deviation of weights of the elements of the divided subsets as the objective function value:

$$\sqrt{\sum_{i=1}^{n}(\overline{X}-x_i)^2/n}$$

where n is a divisor, $x_i$ is a summation of weights of the elements of i-th divided set, and $\overline{x}$ is a mean value from $x_1$ to $x_n$.

8. The planning system according to claim 6, wherein said objective function value operation unit obtains said objective function value by calculating a difference between a difference between summations of weights of at most two unaltered subsets and a difference between those of at most two altered subsets.

9. The planning system according to claim 6, wherein said plan renewal unit further replaces the previous plan by the current plan, when a difference between the objective function plans of the previous plan and the current plan is smaller than a preset variable.

10. The planning system according to claim 6, wherein said plan renewal unit determines a difference between the objective function value of the previous plan and the objective function value of the current plan, obtaining a preset variable based on the number of times of repetitions for each plan number, and compares the preset variable and the difference, and when the preset variable is smaller than the difference, obtains the optimum plan.

11. The planning system according to claim 6, further comprising a memory device for storing the values of variables required to solve the given planning problem.

* * * * *